Figure 1:
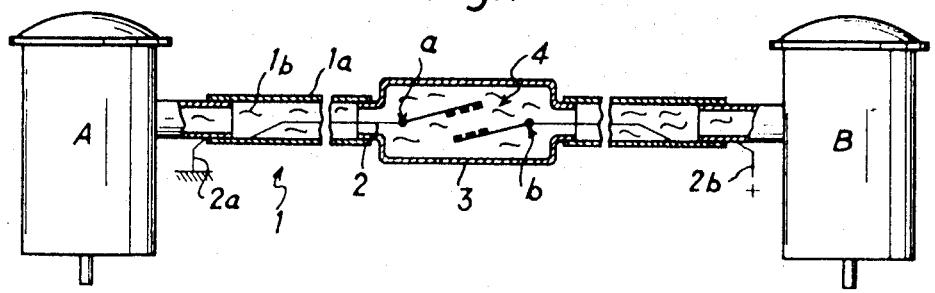

United States Patent

[11] 3,622,747

[72] Inventor Pierre Cibie
 Paris, France
[21] Appl. No. 840,334
[22] Filed July 9, 1969
[45] Patented Nov. 23, 1971
[73] Assignee Projecteurs Cibie
 Bobigny, France
[32] Priority July 22, 1968
[33] France
[31] 160,050

[54] HYDRAULIC TRANSMISSION SYSTEMS
 3 Claims, 2 Drawing Figs.

[52] U.S. Cl. .................................................. 219/307,
 137/341, 219/301
[51] Int. Cl. .................................................. F24h 1/10
[50] Field of Search ........................................... 219/201,
 306, 307, 300, 301; 137/341

[56] References Cited
 UNITED STATES PATENTS

| | | | |
|---|---|---|---|
| 2,375,563 | 5/1945 | Kirk ............................ | 219/301 UX |
| 3,371,186 | 2/1968 | Trabilcy ....................... | 219/300 |
| 1,847,198 | 3/1932 | Torrisi.......................... | 219/307 |
| 1,905,439 | 4/1933 | Carleton....................... | 219/307 |
| 2,556,440 | 6/1951 | Rappl........................... | 219/306 X |
| 2,716,179 | 8/1955 | Cornella....................... | 219/307 |
| 3,365,567 | 1/1968 | Smith et al.................... | 137/341 X |

*Primary Examiner*—J. V. Truhe
*Assistant Examiner*—Hugh D. Jaeger
*Attorney*—Breitenfeld & Levine

ABSTRACT: A hydraulic transmission circuit includes an electric-heating circuit within it. The heating circuit includes a heating wire and a temperature-responsive switch for opening and closing the heating circuit in response to the temperature of the hydraulic liquid. The switch may comprise bimetallic strips having magnets which attract each other at the ends of the strips carrying the switch contacts.

PATENTED NOV 23 1971

3,622,747

INVENTOR:
PIERRE CIBIE

By
Breitenfeld & Levine
ATTORNEYS

HYDRAULIC TRANSMISSION SYSTEMS

This invention relates to hydraulic transmission systems.

It is well known that the accuracy of a hydraulic transmission system is substantially affected by temperature variations to which it is subjected. In the case of local or ambient temperature variations the expansion or contraction of the external tubular casing of a hydraulic transmission circuit is generally different from that of the liquid column it contains. As a result, when a control transmission is made hydraulically between a driving member and a driven member to effect a predetermined corresponding displacement, strict correspondence can only be obtained for a precise temperature and, at other temperatures, the effective correspondence obtained is only approximate.

In a certain number of technical fields, hydraulic transmission systems are used in which precise transmission at any temperature is essential. Such is the case, in particular, in systems used for controlling the height of automobile headlamps with variations in the vehicle attitude and more particularly, with variations in position of the sprung part of the vehicle relative to the unsprung part at the level of the rear axle and/or the front axle. In this case, it is necessary to transmit to the headlamps, by hydraulic means, displacements occuring at the mechanical "output" of one or both positions controllers located at the rear and/or front of the vehicle. Arrangements of this kind are disclosed for example in French Pat. Nos. 1,409,173 1,418,215, 1,419,822 and 1,438,576.

In such a case, the precision and accuracy of the hydraulic transmission become extremely critical factors since a very slight irregularity in the height of the headlamps, by for example only several degrees, renders the entire headlamp system inefficient.

The present invention is concerned with a novel manner of compensating for the influence of temperature variations on a hydraulic transmission system according to which there is maintained appreciably constant, between two limits determined by the system construction, the temperature of the hydraulic system.

According to the present invention there is provided a hydraulic transmission system comprising an electric-heating circuit connected to a source of electricity supply and controlled by at least one switch means whereof the opening or closing is a function of the temperature of the circuit, which is thus always maintained appreciably constant.

In a preferred embodiment, the heating circuit is constituted by a thin conducting wire extending linearly throughout the hydraulic circuit.

Preferably also, each switch means comprises two bimetallic strips each having a free end and provided with an electric contact at said end conveniently connected to the electric-heating circuit.

In a particularly preferred embodiment, the contact of each bimetallic strip is associated with at least a small permanent magnet, these magnets tending to attract the contacts to each other, which ensures a snap closure or separation of the contacts to close or open the heating circuit.

Figure 2:
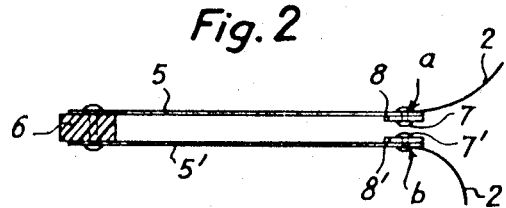

An embodiment of the present invention will now be described, by way of example, with reference to the accompanying drawing, in which:

FIG. 1 shows schematically a hydraulic transmission system in accordance with the present invention; and, FIG. 2 shows a preferred bimetallic switch means.

The hydraulic system 1, according to the invention, is adapted to ensure hydraulically the transmission of a displacement between member A and member B. This system comprises a circuit constituted by a casing 1a filled with a hydraulic transmission liquid (oil, mixture of water and glycerine, etc.).

According to the invention, an electric wire 2, connected to ground at one of its ends 2a and to the positive terminal of a source of electricity supply at its end 2b, extends wholly along the circuit 1. In a chamber 3, provided in the circuit, the electric-heating wire is connected to two terminals $a$ and $b$ of a temperature-sensitive switch 4 which will be more fully described later.

To understand the operation of the system, it is sufficient to indicate that the control of temperature of the switch 4 is provided for between a lower limit T0 and upper limit T1, T1 also being the maximum temperature to which the system can be subjected in normal ambient conditions. When the temperature in chamber 3 (which is generally the temperature of the entire circuit) is equal or greater than T1 the switch 4 is open. On the other hand, when the temperature of the circuit descends to T0 the switch 4 closes and makes the heating circuit which reheats the hydraulic circuit. The rather slight difference between T1–T0 is representative of the sensitivity of the switch means.

It can thus be seen that the temperature of the hydraulic circuit remains always within the narrow range T1–T0 which ensures the precision and uniformity of the hydraulic transmission which it affects.

In operation, the temperature of the circuit varies constantly between T0 and T1 with repeated openings and closures of the heating circuit.

In the case of a control system for automobile headlamps the system will be preferably controlled for an operating temperature between −30° C. and +60° C. At a temperature of −30° C., the heating circuit will be constantly closed; with progressive increase in the ambient temperature, the durations of closure will become relatively less.

FIG. 2 shows a preferred construction of switch 4. In this construction, the switch comprises two bimettic strips 5 and 5' secured at one end to an insulation block 6. At their free end, each strip carries a contact 7, 7'. In addition, each contact 7, 7' is surrounded by a magnetic ring 8, the two rings tending to attract one another; each ring is for example formed of materials containing magnetic ferrites("Plastoferrit" for example). The two bimetallic strips are urged apart when the system operates at an elevated temperature and together in the case of a decrease in temperature.

The presence of the magnetic rings 8 facilitates snap opening and closure of the heating circuit. When the contacts 7, 7' approach one another the presence of these magnetic rings ensures a clean or snap closure when the contacts of separated only by a short distance; similarly when the contact 7 and 7' are contiguous, the opening only takes place when the separating force of the bimetallic strips is sufficient to overcome the mutual attraction of the magnetic rings; in these conditions there is a clean or snap opening.

However, the present invention is not limited to the construction described, but may extend to any variations within the scope of the accompanying claims. In particular, the heating circuit may comprise a number of elements connected in series and/or in parallel, with a plurality of switch means such as 4 conveniently distributed throughout the circuit.

What is claimed is:

1. A hydraulic transmission circuit comprising:
   a. two spaced-apart liquid displacement members,
   b. means for transmitting displaced liquid between said members, said means including
      I. a tube extending between said members,
      II. said tube being filled with hydraulic liquid, and
   c. means for maintaining liquid displaced within said hydraulic transmission circuit substantially immune to ambient temperature variations, said means including:
      I. an electric-heating element within said tube and extending for substantially the entire length of said tube, and
      II. thermostatically controlled switch means, responsive to small temperature variations in the hydraulic liquid in said tube for controlling the energization of said heating element, whereby the temperature of the hydraulic liquid is substantially maintained within a narrow temperature range determined by said thermostatically controlled switch regardless of ambient temperature variations.

2. A hydraulic transmission circuit as defined in claim 1 wherein said thermostatically controlled switch means comprises at least one bimetallic strip having a free end, a first electric contact mounted at said end connected to said electric heating element, and a second electric contact connected to said heating element and adapted to be engaged by said first contact.

3. A hydraulic transmission circuit as defined in claim 2 including a magnetic element fixed with respect to said second contact, and a permanent magnet carried by said bimetallic strip adapted to be attracted to said magnetic element.

* * * * *